COMPUTER WITH LOGIC CONTROLLED ANALOG COMPUTING COMPONENTS
WHICH AUTOMATICALLY CHANGE MATHEMATICAL
STATES IN RESPONSE TO A CONTROL MEANS

Filed April 20, 1965 7 Sheets-Sheet 1

INVENTOR.
MONROE A. MILLER
BY Christie, Parker & Hale
ATTORNEYS.

Sept. 30, 1969 M. A. MILLER 3,470,362

COMPUTER WITH LOGIC CONTROLLED ANALOG COMPUTING COMPONENTS WHICH AUTOMATICALLY CHANGE MATHEMATICAL STATES IN RESPONSE TO A CONTROL MEANS

Filed April 20, 1965 7 Sheets-Sheet 2

INVENTOR.
MONROE A. MILLER
BY Christie, Parker & Hale
ATTORNEYS.

COMPUTER WITH LOGIC CONTROLLED ANALOG COMPUTING COMPONENTS WHICH AUTOMATICALLY CHANGE MATHEMATICAL STATES IN RESPONSE TO A CONTROL MEANS

Filed April 20, 1965 7 Sheets-Sheet 3

INVENTOR.
MONROE A. MILLER
BY Christie, Parker & Hale
ATTORNEYS.

Sept. 30, 1969 M. A. MILLER 3,470,362

COMPUTER WITH LOGIC CONTROLLED ANALOG COMPUTING COMPONENTS
WHICH AUTOMATICALLY CHANGE MATHEMATICAL
STATES IN RESPONSE TO A CONTROL MEANS

Filed April 20, 1965 7 Sheets-Sheet 4

INVENTOR
MONROE A. MILLER
BY
Christie, Parker & Hale
ATTORNEYS.

COMPUTER WITH LOGIC CONTROLLED ANALOG COMPUTING COMPONENTS WHICH AUTOMATICALLY CHANGE MATHEMATICAL STATES IN RESPONSE TO A CONTROL MEANS

Filed April 20, 1965 7 Sheets-Sheet 5

INVENTOR
MONROE A. MILLER
BY
Christie, Parker & Hale
ATTORNEYS

INVENTOR.
MONROE A. MILLER
BY Christie, Parker & Hale
ATTORNEYS.

INVENTOR.
MONROE A. MILLER
BY
Christie, Parker & Hale
ATTORNEYS.

United States Patent Office 3,470,362
Patented Sept. 30, 1969

3,470,362

COMPUTER WITH LOGIC CONTROLLED ANALOG COMPUTING COMPONENTS WHICH AUTOMATICALLY CHANGE MATHEMATICAL STATES IN RESPONSE TO A CONTROL MEANS

Monroe A. Miller, Coral Gables, Fla., assignor to Milgo Electronic Corporation, Miami, Fla., a corporation of Florida Filed Apr. 20, 1965, Ser. No. 449,491
Int. Cl. G06g 7/32
U.S. Cl. 235—150.4 18 Claims

ABSTRACT OF THE DISCLOSURE

In an analog computer having a problem flow path, manually patched multi-state analog computing components connected in the problem flow path, operator control means associated with the computer components so as to have themselves automatically change mathematical states in response to electrical signals from the control means.

This invention relates in general to computers and more particularly relates to an analog computer having a logic level access control for automatically establishing the mathematical functions to be performed by analog computing components in a problem signal flow path.

In analog computer art it is common practice to manually insert jumper leads between input and output terminals of different computing components so as to connect these components in a problem path as specified by a particular problem solution diagram. This problem path when finally established is a completed circuit through a group of components each of which is capable of performing a different mathematical operation on an input signal or signals.

Each analog computing component has, prior to the time of this invention, required several circuit components and numerous circuit interconnections to establish the capability of performing a desired mathematical operation. These interconnections, in the past have been made manually by jumper leads, pins, or so-called bottle plugs, which actually represent physical connections of various components in a circuit pattern that develop the particular desired mathematical function. These mathematical functions are often extremely complex, and each one requires different circuit connections for each different mathematical function to be accomplished. Accordingly, the prior art approach of physically connecting bottle plugs or jumper cables for desired mathematical functions is inefficient as it wastes much operating time.

Furthermore, each computer must provide a great number of circuit elements that are available for the interconnecting operations, and it is a complex and time consuming task to select the proper circuit elements and combine them into an analog computing component. Furthermore, manual selecting and patching limits the types of problems that can be solved because if the mathematical capability of one component must be changed at some point during a problem, the computer must be stopped in the middle of a problem solving process and be held while the operator manually changes the mathematical functions for the particular computing components in that signal flow path. Of course, any mistake in the disturbance of some other circuit connection than those to be changed will completely destroy the problem solving operation.

The foregoing disadvantages of the prior art are avoided by the new and improved automatic addressing and control system of this invention. In accordance with the principles of this invention an analog computer is manually provided with a problem flow path which includes at least one analog computing component, and more probably includes several such computing components. In this invention each analog computing component is a multi-state circuit wherein each state represents a different problem solving capability. Every multi-state analog computing component in a problem flow path is automatically settable by a function command so as to assume different states and thus provide different functional modes, each representing a different mathematical operation that the component is capable of performing. These function commands are selectively initiated by a logic level addressing circuit that addresses each component in the problem flow path, and once addressed designates one of the several mathematical operations which it can perform by automatically establishing that component in its proper mathematical state without the use of any manual connections characteristic of prior art analog computing systems.

Further, in accordance with the principles of this invention the foregoing multi-state analog computing components represent new and improved multi-function circuits. These components include a new and improved extended range attenuator having a plurality of function modes that are selectable by the logic level addressing circuit. These function modes extend the range of signal output levels that are deliverable by the attenuator.

Another component is a new and improved multiplier, automatically settable in one of several states to perform the mathematical operations of squaring, dividing, taking the square root of an input signal, or multiplying.

The foregoing principles and features of this invention may more fully be appreciated by reference to the accompanying drawing in which.

Figure 1:
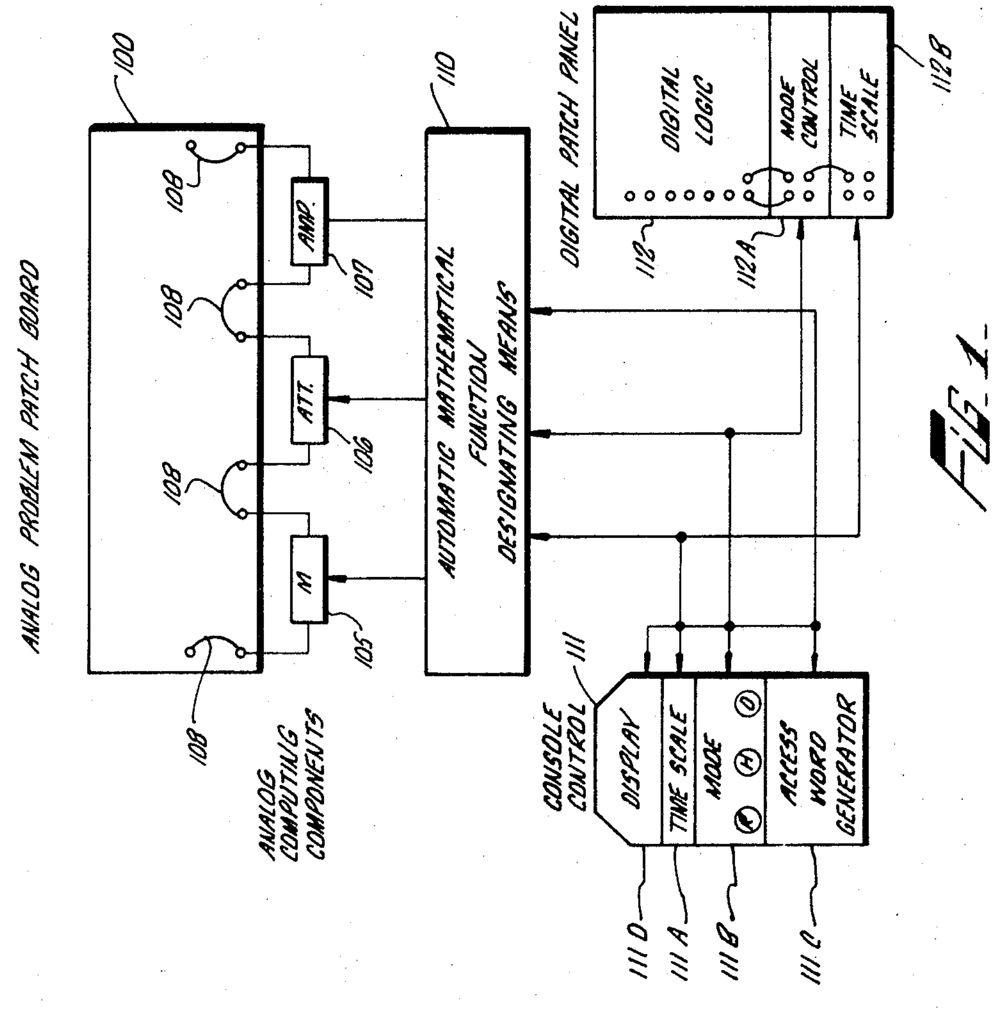
FIG. 1 is a block diagram of an analog computer in accordance with the principles of this invention.

Turning now to FIG. 1, a block diagram of the analog computer in accordance with the principles of this invention is shown. The patch board has exposed on its face a multiplicity of holes or terminals which are electrically wired into the computing component inputs and outputs. The patch board terminals, in a manner typical of most of today's analog computers, allow an operator by the use of bottle plugs or jumper cables to establish physical connections to selected analog computer components and arrange those components so selected in a complete problem flow path.

A problem flow path is a path for any number of input signals that are either generated within the computer or may be applied from external sources. These input signals serve as variables to be operated on mathematically by the components of that path.

In FIG. 1 for example, the analog computing components include a multiplier 105, an attenuator 106 and an amplifier 107 all of which would be connected in a signal flow path as shown. These various analog computing components such as 105, 106 and 107, may be established in the problem flow path by jumper cables or other suitable means designated as elements 108. Establishing a problem flow path by patching with elements 108 is standard in the art, and thus is not claimed as new for this invention.

Prior to the date of this invention, however, prior art analog computers required a patch board of considerably larger size and complexity than the problem patch board 100 of FIG. 1 or else required a separate board for function programming. An operator was forced to utilize physical connections to establish the function or state of the various analog computing components. There is no requirement for such a board and its associated complex interconnecting in this invention because each one of the analog computing components is a self-sufficient multi-state unit, represented on the problem patch board only by one or more inputs and one or more output terminations. These input and output terminations establish the actual analog signal paths represented by a problem to be solved; and the particular mathematical operation which each analog computing component is required to perform in that signal path is automatically controlled by the automatic mathematical function designating means 110. Thus each self-sufficient unit of this invention is capable of assuming one of several states, and performing the mathematical operation provided by that state. These states are readily settable at any desired time, and at any point in a problem solving process, by an operating means at the control console 111.

There are available to an operator at the console control 111 a number of different computer operations that are standard in the art. For example the operator, by use of the time scale control section 111A, can deliver a signal to the function designating means 110 which signal automatically controls the speed at which an integrating amplifier in the problem path solves an input problem. A mode section 111B is also present at the console control and this mode section includes RESET, HOLD and OPERATE buttons. These buttons deliver the mode control signals to the function designating means and perform the functions indicated by the titles for these buttons. Namely, the OPERATE button is pressed to start a problem solving operation. If at some stage in the solution it is desired to hold the solution at that point, the HOLD button may be pressed and the operation will stop at that point. The RESET button resets all of the computing components to their initial conditions.

Console control 111 also includes an access word generator 111C which may be any suitable generating component such as a punch keyboard, a digital computer, punched cards, or paper or magnetic tape. The access word delivered by this generator 111C will be described in greater detail hereinafter, and its general purpose is to supply the function designating means 110 with logic level inputs that automatically control the mathematical functions which each of the analog computing components are to perform at any given instant during a problem solving period. A digital patch panel 112 is also available as shown by FIG. 1 and this digital patch panel 112 includes a mode control section 112A and a time scale section 112B. This digital patch panel 112 provides greater flexibility by controlling, through logic gates or digital computer lines, special purpose integrators that are discussed in greater detail hereinafter.

A display device 111D is present at console control 111. This display device may take any well known form. For example, it may be a rear lit panel or a printer for paper tape or punched cards. This display device assures the operator that after the function designating means 110 has completed its designating operation, the problem analog computing component was correctly addressed, and that the state, i.e., the mathematical function for that component was correctly received and assumed.

Figure 2A:
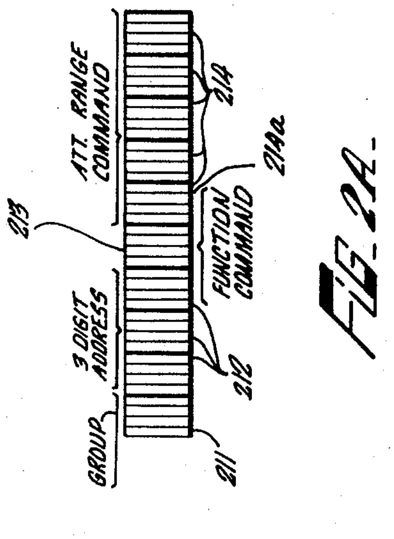
FIG. 2A depicts one possible format of an access word delivered by the addressing circuit of FIG. 2.
Figure 2:
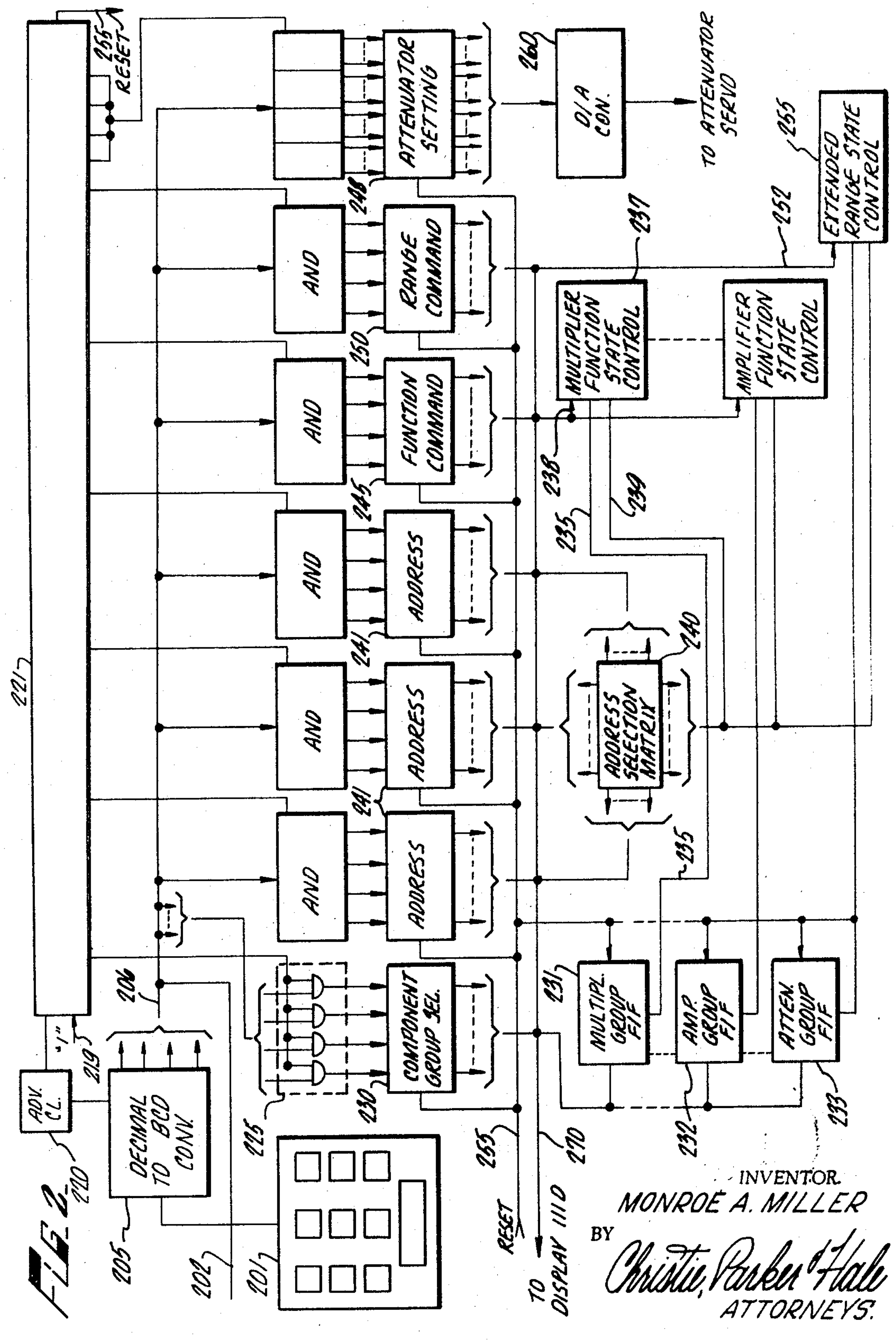
FIG. 2 is a block diagram of an addressing circuit for selecting automatically a particular component and designating the mathematical function to be performed by that component.

FIG. 2 is a block diagram of the analog computer command entry sub-system. This entry sub-system provides logic level addressing and logic level function control for all mathematical capabilities of the computing components and affords complete elimination of any manual patching required to alter the mathematic capabilities of computing components characteristic of prior art computers. The circuitry of FIG. 2 is addressable by either a keyboard 201, or may be addressed by a digital computer or by punched or magnetic tape, or any other suitable means as alternatives available at input terminal lead 202.

If a keyboard address 201 is employed, 10 decimal digits, namely 0 through 9, are available as outputs from the keyboard buttons. This keyboard may advantageously be any of the well known keyboards, as utilized for example on push-button dial telephones. If the keyboard 201 is the addressing component, an operator by punching a selected keyboard button delivers a decimal number from that punched button to a decimal to binary coded decimal converter 205. This converter 205 may advantageously be any well known decimal to binary converter that provides a 4-bit output of 1's or 0's arranged in an 8, 4, 2, 1 format or other code, if desired. Thus each punched number on keyboard 201 is delivered in serial binary coded decimal form at a signal bus 206. Prior to a discussion of the circuit operations for decoding the signals applied to bus 206, reference is made to FIG. 2A which defines the word structure for an access operation. It should be understood that this word structure is merely exemplitive of one possible addressing format and should not be taken as limiting.

In FIG. 2A an entire access command includes a word having up to 10 characters in which each character includes 4 binary coded decimal bits. The first character 211 is a component group designating character and is utilized to choose, according to its value one entire group of all similarly designated analog computing components. For example, a group of multipliers would all have the same address character such as, for example, character 1; all even-numbered amplifiers might be designed by the character 2 while odd-numbered amplifiers might be designated by a 3. Attenuators might be designated as another character and so on for all of the remaining analog computing components.

The second group of characters in the access command word of FIG. 2A, includes three characters 212 which form a 3-digit address. These characters select one component from among all of those components which make up the designated component group. The next character 213 includes a function command. This function command designates the particular mathematical operation that is to be performed by the addressed component of the selected component group. The final five characters 214 define the attenuator settings and attenuator range commands. Preferably 214A of the last five characters 214 is employed in order to signfy the range of signal level output. Thus the output signal is in two parts, a whole number (range) followed by a decimal fraction (attenuator setting). This setting is in accordance with the last four characters of the attenuator command signal.

Assuming that the access word of FIG. 2A is generated by the operator at keyboard 201, the word in serial form will appear on bus 206, one parallel character at a time with the group designating character 211 first. During the conversion process of the decimal digit from keyboard 201 by converter 205 a "1" is inserted at lead 219 of shift register 221 in a manner well known in the art.

Shift register 221 may be any conventional shift register that operates under control of an advance clock 220 to shift the inserted 1 from one stage to the next under timing established by clock 220. Advance clock 220 delivers an advance signal for each output from converter 205, and each advance signal controls the shifting operation of shift register 221. Thus, at a proper time, when group designating character 211, FIG. 2A, is present in parallel form on bus 206, an output from the first stage of shift register 221 is delivered to a group of AND gates 225 which are connected between bus 206 and a component group selector circuit 230. This output to AND gates 225 allows the four binary coded decimal bits of group designating character 211 to be conducted into a component group selector circuit 230, wherein these bits are converted into a designating signal that is applied to the appropriate group.

For example, if the group designating character 211 is punched, or otherwise addressed, and this character designates the multiplier group, an output signal from component group selector circuit 230 sets the multiplier group control flip-flop 231. In a similar manner of course the designating character could set an amplifier control flip-flop 232, an attenuator control flip-flop 233 or any one of a number of similar control flip-flops for other computing component groups not shown. These other computing components, could include resolvers, relays, electronic switches, limiters, and function controlled generators, to list only a few.

Setting of the multiplier group control flip-flop 231 grounds its output lead 235 which is connected in common to all of the multiplier function state control circuits 237. These multiplier function state control circuits 237 will be described in more detail hereinafter, but for present purposes suffice it to say that this one signal alone, when applied to all of these circuits, does not activate any one multiplier of the group. In order for a particular function change to take place in any addressed multiplier there must also be output indications on each of the remaining two input leads 238 and 239 respectively of control circuit 237.

Address selection matrix 240 receives three characters, each representing one digit of a three digit address, such as depicted as address 212 in FIG. 2A. Each digit of that address in a manner similar to that just described, and under control of shift register 221, is applied through a group of AND gates similar to that of group 225.

Three address converter circuits 241 are connected to three AND gate groups. Each of these address converting circuits 241 may be any well known binary coded decimal to decimal converter circuit which enables one output lead according to the value of the address digit. Outputs from each of the three digit address converters 241 are applied to an address selection matrix 240. This matrix 240 may be an electronic switching matrix, crossbar switch, or a relay matrix of any well known type. Matrix 240 translates each of the converted address digits and delivers an enabling output to one only of all available multipliers in the multiplier state control circuit group 237. Accordingly, only one multiplier state control circuit out of the group 237 will be addressed by an output signal from address selection matrix 240 by way of an input lead 239 connected between matrix 240 and the second multiplier.

As shown in FIG. 2A the next character that is designated by the operator at keyboard 201 is the function command character 213. This character 213, under control of shift register 221, is gated at the proper interval through the function command circuit 245. An output from this function command circuit 245 supplies an input signal to the selected computer component state control circuit. This function command signal automatically designates one of the several possible mathematical functions that the addressed component is capable of performing. This mathematical function is thus controlled by the operator at the keyboard 201, or by any of the other alternative word generating means listed hereinbefore.

The five characters 214 are employed only if an attenuator is the analog computing component addressed by the operator. These last 5 characters, if an attenuator is selected, include a range command signal as the first character and an attenuator setting signal as the last four characters. These signals will be described in greater detail hereinafter in connection with the extended range attenuator that is one of the numerous analog computing components addressable by the circuitry of FIG. 2. Briefly, however, the range command signal designates a decimal number that an output signal level assumes after it is mathematically operated on by the selected attenuator. This range command signal, in a manner similar to that previously described, is applied to one circuit of the extended range control group 255 by an output from range command 250 via lead 252.

The last four command characters 214, FIG. 2A, are gated through four groups of AND gates 247 and through an attenuator setting converter circuit 248. This attenuator setting converter circuit 248 establishes at its output four binary coded decimal numbers that are received by any well known digital to analog converter circuit 260 which converts these signals into an analog value for driving an attenuator servo system. This system, as described in more detail hereinafter, adjusts a potentiometer setting at a decimal fraction which corresponds to the value designated by the operator at keyboard 201.

Each one of the converter circuits discussed in the foregoing also advantageously include a storage register for storing delivered output signals. These stored signals from the component group selector circuit 230, address circuits 241, the function command circuit 245, and the range command 250, appear on output lead 270 which is connected to the display device at the control panel 111 of FIG. 1. As stated earlier by this technique the operator verifies that the component addressed and the mathematical function or signal range level designated by him has been properly performed automatically by the address circuitry of FIG. 2. After the last character of an access word has been gated and translated, shift register 221 delivers at a proper time, a reset pulse on reset output lead 255. This reset pulse from shift register 221 clears all of the components to which it is connected in FIG. 2 so that the address circuitry is in a condition to receive the next access word.

The foregoing described access circuit operation allows automatic designation of a particular computing component that has been previously connected in a problem signal flow path by any suitable means such as jumper leads, pins, or bottle plugs. This logic level addressing and logic level function and range control of the various analog computing components presents a new and unexpected efficiency and operation that is free of wiring errors present in prior art analog computers.

It should be understood, in accordance with the principles of this invention, that each analog computing component present in a problem signal flow path is capable of performing at least two different mathematical operations on signals applied to it during a problem solving period.

Table I summarizes the various mathematical operations which some of the analog computing components of this invention can perform under the automatic logic level control by an operator, a digital computer, or other addressing means. In Table I each of the analog computing components are listed in the first vertical column and the various mathematical operations and a unique logic level signal for designating each one of the listed mathematical operations are presented horizontally opposite the appropriate computing component:

TABLE I

| Analog Computing Component | Logic Level State Number 0 | 1 | 2 | 3 |
|---|---|---|---|---|
| Multiplier | Multiply | Divide | Square | Square root. |
| Extended range attenuator | Logic levels define whole and decimal settings. | | | |
| Amplifier (bi-state) | Sum | High-gain amplifier. | | |
| Amplifier (multi-state) | Integrate | Sum | Special purpose integrator (digital patch selection). | |

Figures 3, 3A:
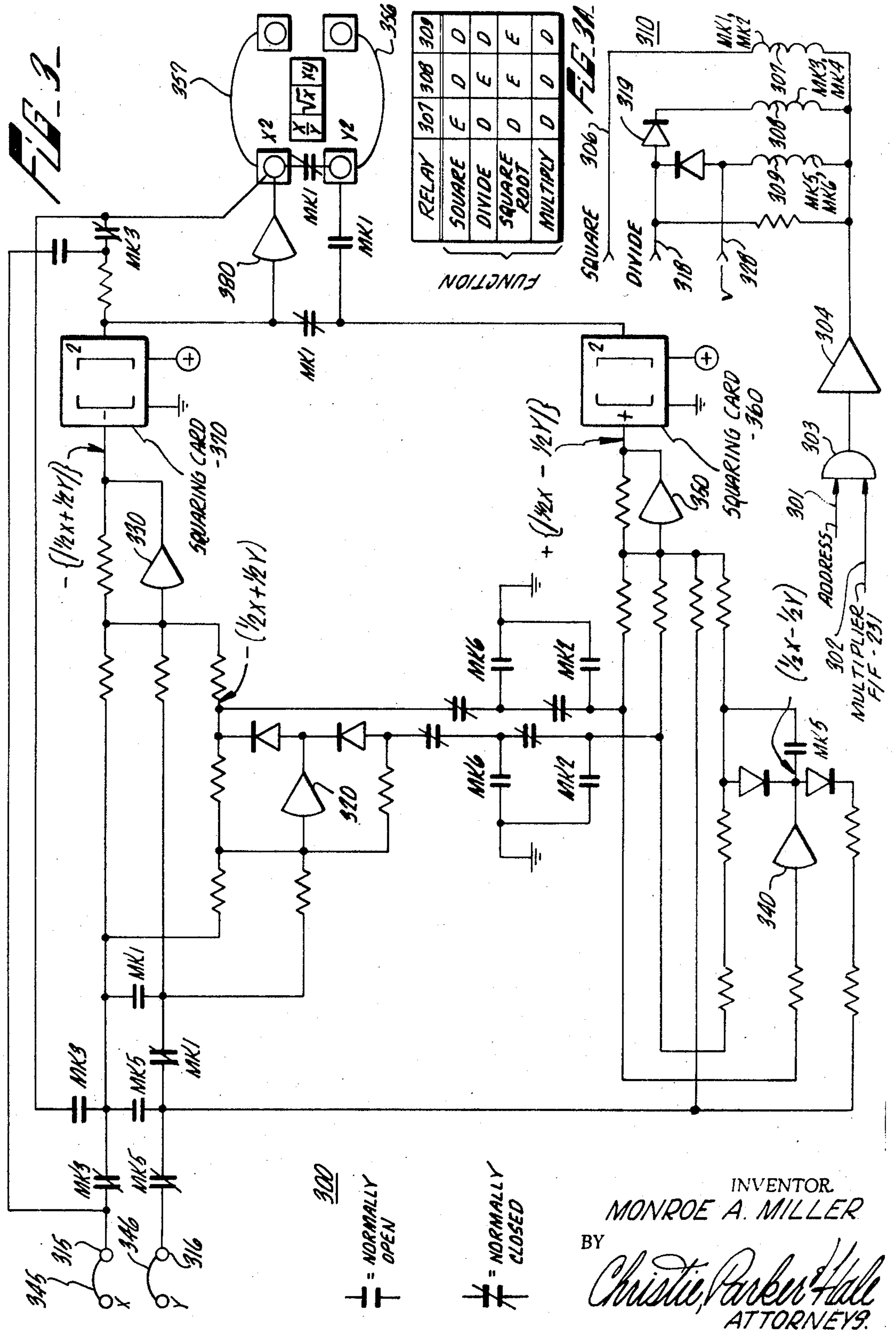
FIG. 3 is a detailed circuit schematic of a multi-state multiplier component and means for setting the states of the component.
FIGS. 3A, 3B, 3C, 3D and 3E are correlated block diagram schematics for each mathematical function that can be automatically designated for the component of FIG. 3.
Figure 3B:
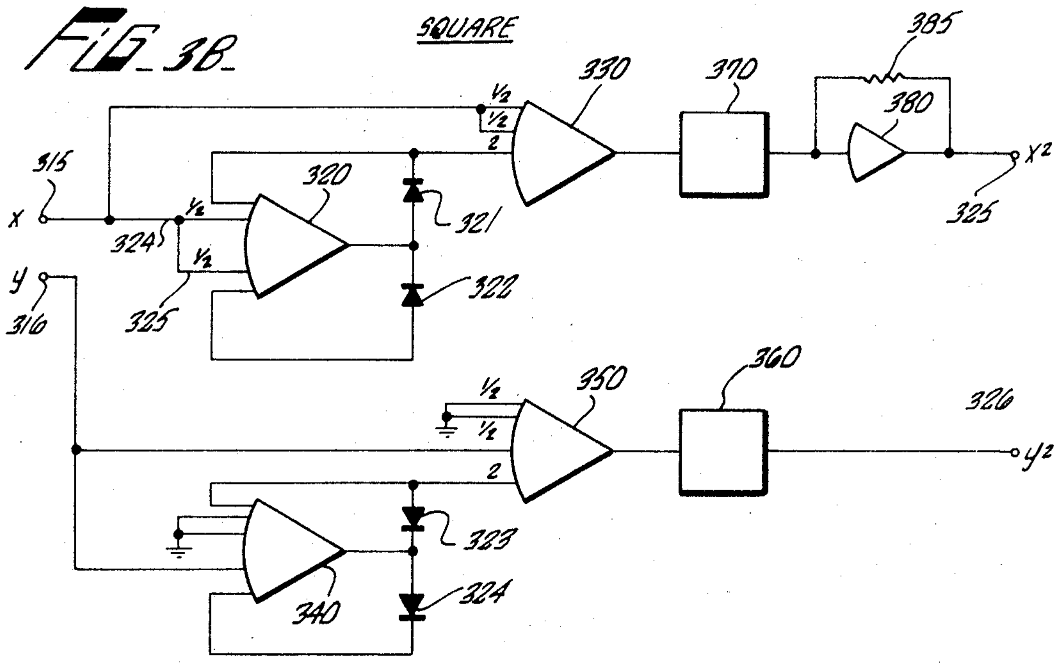

Multiplier circuit 300, when it is performing a squaring function as a result of the foregoing described operation, is repeated in FIG. 3B in block form. Comparison of FIG. 3B with multiplier circuit 300 shows that certain of the resistors have been omitted. Also omitted are all open circuits established by the de-energized condition of relays 308 and 309. Thus in FIG. 3B through FIG. 3E the amplifiers and squaring cards of the circuit 300 are shown along with completed circuits established by the relay states of the table of FIG. 3A. For example in a squaring operation FIG. 3B depicts amplifiers 320, 330 and 340, 350 connected as they would be where relay 307 is energized and relays 308 and 309 are de-energized. Amplifier 320 in FIG. 3B includes the diodes 321 and 322 connected in a standard manner for achieving an absolute value of the terms which are being operated on by the circuit. In FIG. 3B representative values of the magnitude of input signals as they would be developed across the resistors of the multiplier circuit 300 are shown by the designated values on the input leads 324 and 325 in FIG. 3B. Throughout the remaining discussion of FIGS. 3B through 3E these values will be employed. In those instances where there is no numerical value listed at the input lead for an operational amplifier, the input value is equal to 1.

Multiplier

The computing component designated as a multiplier is capable of performing four distinct mathematical operations, as a typical example, although these four operations should not be taken as limiting as others are possible. The four mathematical functions which can be performed by the multiplier circuit 300, indicated in Table I, include multiplying, dividing, squaring and taking the square root of an input number. These mathematical functions are automatically selected by the addressing technique of this invention by the application of digital logic level signals on the function state control circuit 310, FIG. 3. State control circuit 310, of course, as explained earlier is one circuit selected from among a group of multiplier circuits shown collectively as multiplier function control 237 in FIG. 2.

In accordance with the foregoing operation it is assumed that multiplier 300 is connected in a problem flow path and is the one multiplier from among the multiplicity of such circuits available in the computer that is addressed. Thus an address signal on lead 301 and a signal from the multiplier group flip-flop 231, FIG. 2 on lead 302, is present. These signals enable AND gate 303 in order to supply relay drive power via amplifier 304 to one of the function state relays 307, 308, or 309.

A pulse on any one of the three leads 306, 318, 328, labeled respectively Square, Divide and Square Root, grounds that lead. This pulse is the output of the function command 245, FIG. 2, described in detail hereinbefore. When one of the input leads 306, 318, 320 is grounded, a bi-stable, mercury-wetted relay is energized when AND gate 303 is satisfied and relay coil driving power is supplied by amplifier 304. The energized or de-energized relay states are listed by an E or a D in the table of FIG. 3A. Once energized the relays remain in the energized state until commanded to a different state. Memory of this energized functional state is thus accomplished in a manner which protects against any loss of problem solving status due to inadvertent shut-down or loss of computer power.

It should be understood, of course, that numerous alternatives within the skill of the art are available to control the multi-state analog computing components of this invention. For example, the bi-stable relays could be replaced by any other suitable mechanical or electrical means such as bi-stable flip-flops controlling semiconductor gates within the multiplier connection leads, or any other suitable components.

One possible input from the function command 245 is for a squaring operation (state "2" from Table I) and lead number 306 accordingly will be grounded by the function command circuit 245. When lead 306 is grounded amplifier 304 drives current through the relay coil 307 in order to operate the relay contacts labeled MK1 and MK2. These contacts are labeled in the multiplier circuit 300 by similar letters. In each case the contacts are shown as normally opened or normally closed contacts that are reversed when the relay coil of circuit 310 is energized.

A complete analytical description of the squaring operation of the circuit of FIG. 3B is fully described in numerous text books and need not be given in detail here. For example, in the text by Albert S. Jackson entitled, Analog Computation, McGraw-Hill, New York, 1960, pages 185 through 187 there is a complete description of a typical squaring operation, with respect to FIG. 5–15(c) of that text. The circuit of FIG. 3B operates in the same manner as described in the text with the addition of diodes 321, 322 and 323, 324 connected to the output of amplifiers 320 and 340. Two amplifiers 330 and 340 are also employed plus the foregoing diodes in order to form an absolute value of the signal prior to its squaring operation. Signals X and Y applied to the input terminals 315 and 316, after operated on by the squaring circuit of FIG. 3B appear at the output terminals 325 and 326 as $X^2$ and $Y^2$.

These input and output terminals 315, 316 and 325, 326 are also shown in FIG. 3 and they would be available on the problem patch board for connection in a signal flow path for signals X and Y. Connection is made by a pair of manually inserted jumper cables 345, 346 and 355, 356. The patch board connections and the jumper cables of FIG. 3 are not repeated in FIGS. 3B through 3E.

Each of the various junction points of FIG. 3B is correlated to a connection in the multiplier circuit 300, FIG. 3, and demonstrate the approximate number of jumper cables, pins, or bottle plugs necessary in prior art operations in order to establish a squaring circuit from components required in prior art analog computers. Accordingly, it is obvious that a considerable amount of time is consumed in physically establishing the various connections which are shown in FIG. 3B to enable prior art components to perform a squaring operation.

Assuming that the function command delivered to the multiplier 300, FIG. 3, by the function command circuit 245 is a command that the circuit perform a division operation rather than a squaring operation, then the input terminal 318 of the state control circuit 310, is grounded and relay coil 308 is energized by the path including a forward biased diode 319. As shown by the table in FIG.

Figure 3C:
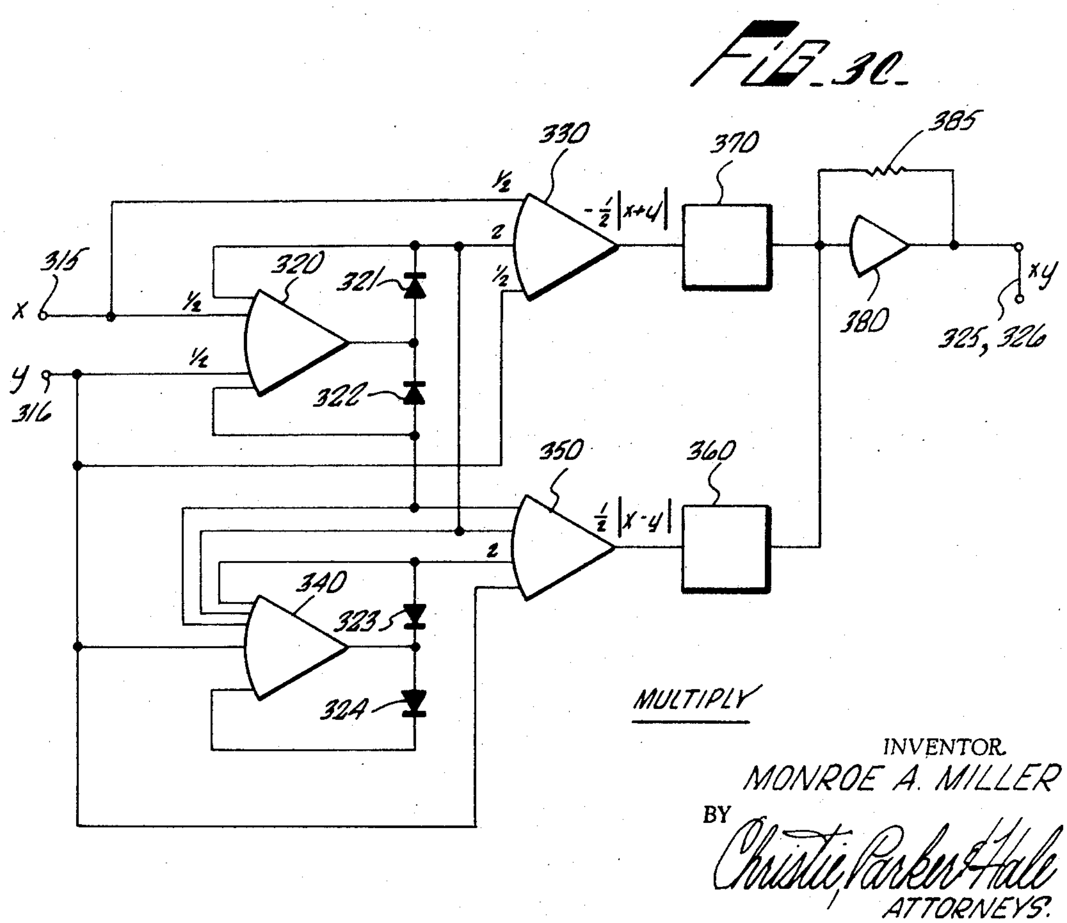

3A, relay coils 307 and 309 are de-energized during a dividing operation. Relay contacts MK3 and MK4 are controlled by the energization of relay coil 308 and assume a contact condition opposite that depicted in FIG. 3. With the relays 307 and 309 de-energized and relay 308 energized the multiplier circuit 300, FIG. 3, is now capable of performing a dividing operation as schematically represented in FIG. 3E. A division operation is described in detail at page 53 with reference to FIG. 2–13 of the foregoing cited text. Accordingly, no description of the circuit operation for FIG. 3E is necessary. Suffice it to say that if the signals to be operated on by the dividing circuit of FIG. 3D are applied to the input terminals 315 and 316 as X and Y, the output terminals 325 and 326 are connected together, and at that output terminal X is divided by Y.

Figure 3D:
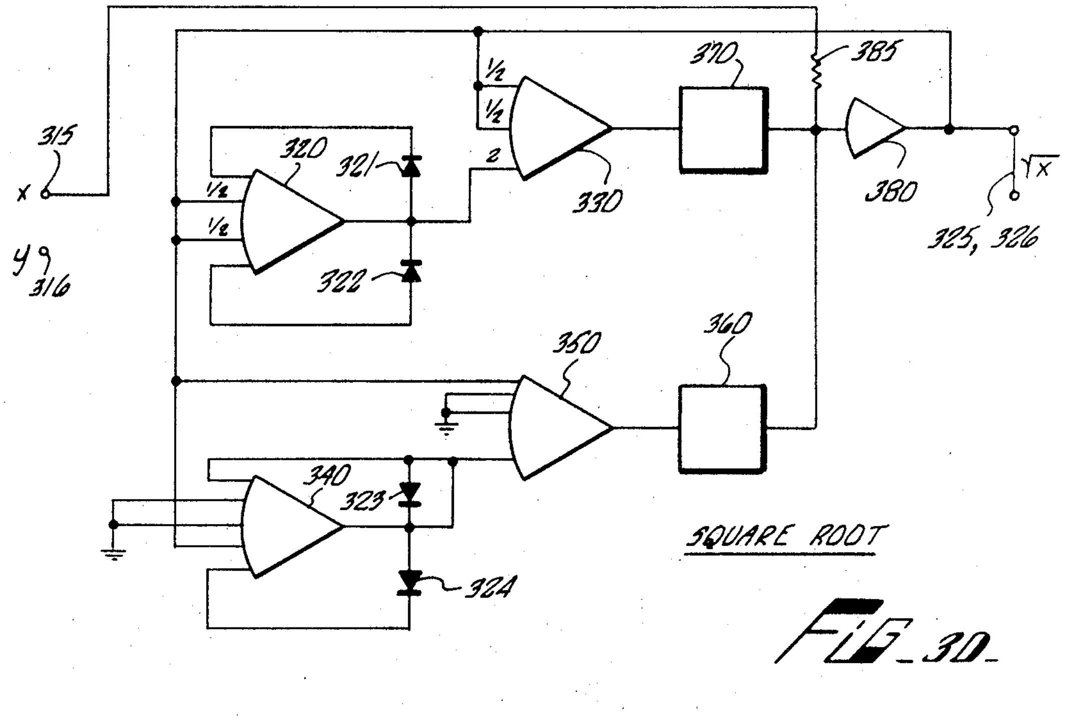
Figure 3E:
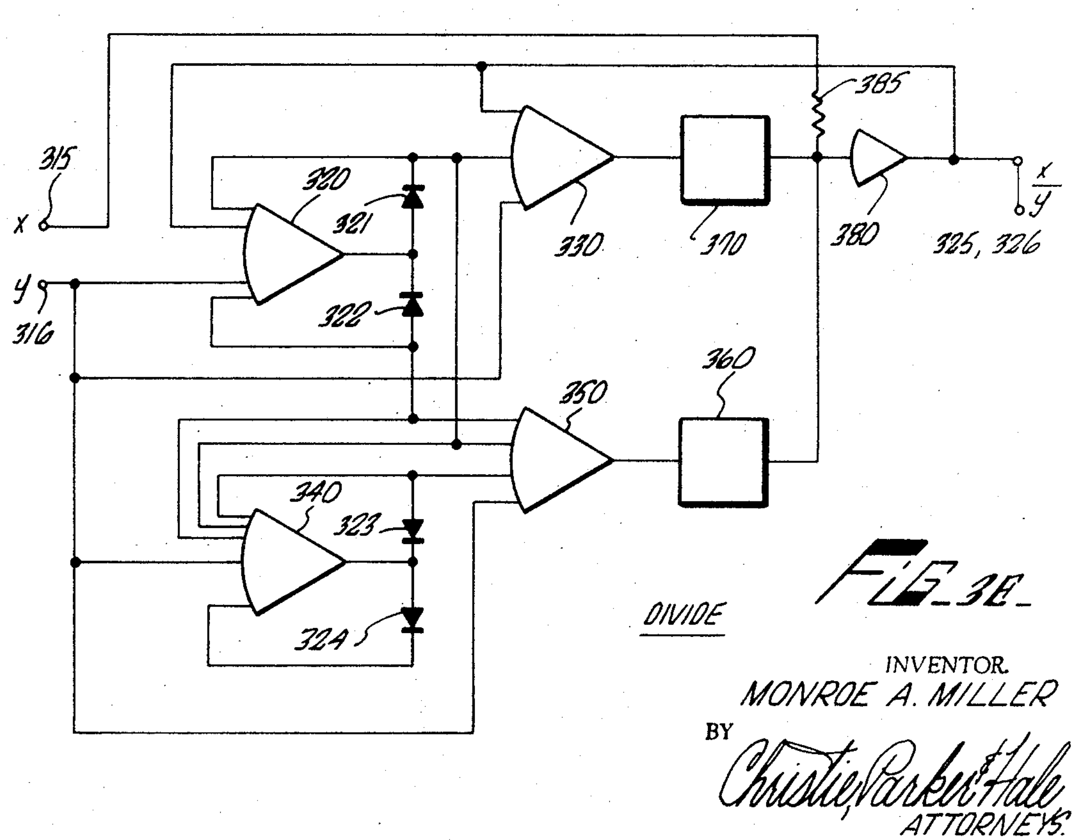

FIG. 3D depicts a square root operation for the multiplier circuit 300 of FIG. 3 when function command 245 applies a state setting signal at lead 328. Relay coils 308 and 309 are both energized as shown in the table of FIG. 3A for the square root operation. When these relays are energized the Y terminal applied to input terminal 316 on the problem patch board is open circuited (as shown) and accordingly, the circuit delivers an output signal which is the square root of X. Reference to page 186 and FIG. 5–16 of the foregoing text describes in detail a square root operation comparable to that performed by the circuit of FIG. 3D, and reference to that text may be made if such detail is desired.

FIG. 3E is the normal multiplier operation for circuit 300 of FIG. 3 when there are no input signals present on leads 306, 318 and 328 of circuit 310. Thus a zero output signal from the function command leaves relays 307, 308 and 309 in a de-energized position. Circuit 300, with these relays in a de-energized position, is schematically shown in FIG. 3C, and is what is commonly known in the art as a quarter-square multiplier. The operation of a quarter-square multiplier is explained in detail, with reference to FIGS. 12–14 on page 478 of the foregoing cited text. Assuming again that the input signals to be operated on by the multiplier circuit are X and Y at the input terminals 315 and 316 of the problem patch board, the output signal or answer will appear at terminals 325 and 326 which are tied together as shown in FIG. 3E. That output signal is the product of X and Y.

Extended range attenuator

Figures 4, 4A:
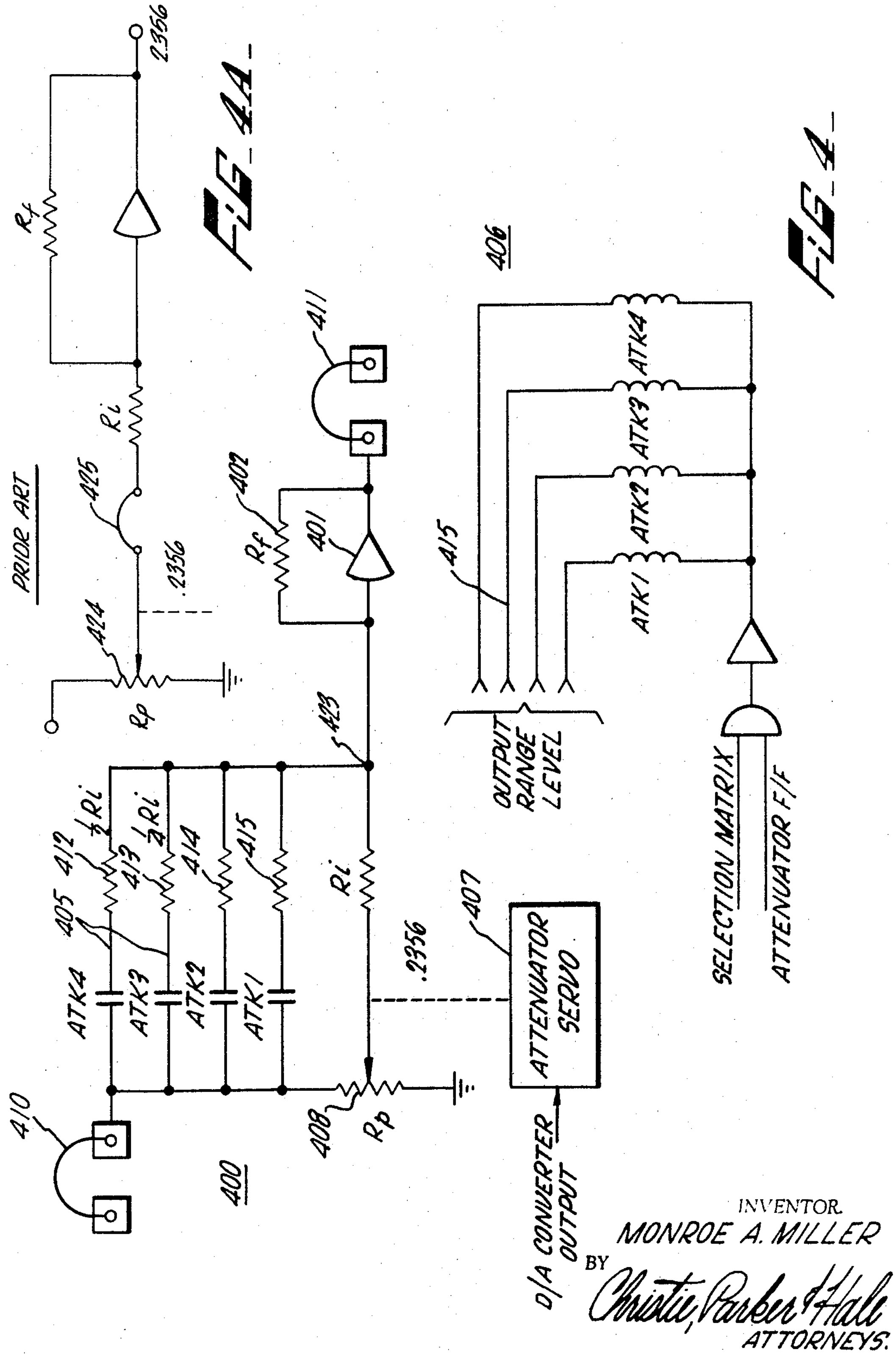
FIG. 4 is a schematic circuit of an extended range attenuator and the automatic range controlling means for that attenuator.
FIGURE 4A is an example of a typical prior art attenuator circuit.

FIG. 4 is a schematic circuit of an attenuator including an extended range state control relay circuit for automatically selecting the decimal value of signal level which the attenuator circuit produces at its output terminal.

In FIG. 4 the extended range attenuator 400 includes a standard operational amplifier 401 having a feedback resistor $R_{f402}$ connected between its output and the input terminal. Input signals for the amplifier 401 are developed by a switch or relay-contact controlled ladder circuit 405 which includes a plurality of resistors 412, 413, 414, 415. This ladder circuit in accordance with the principles of this invention is controlled automatically by the extended range state control circuit 406, which state control circuit is one only from the group of extended range state control circuits shown collectively as block 255 in FIG. 2.

A typical prior art attenuator circuit is shown in FIG. 4A, and includes a standard operational amplifier 421 connected with an input resistor $R_i$ and a feedback resistor $R_f$. The output equation for the attenuators of FIG. 4 and FIG. 4A may be expressed as follows:

$$\text{(a)} \qquad e_o = -\frac{R_f}{R_i} e_i$$

An attenuator in accordance with the foregoing equation responds to an input signal such as that obtained by adjusting resistor $R_p$ of the potentiometer 424 by delivering an output signal amplified by the ratio of the feedback resistance to the input resistance. The input signal may be a four decimal place setting such as .2356 which, as a typical example, is within the capabilities of most of today's potentiometers. An output terminal from the potentiometer 424 is manually connected by a jumper cable 425 to the input resistor $R_i$ of the attenuator circuit. An operator, if it is assumed that the desired signal range is 10 times that of the input, connects jumper 425 to an input resistor that is one-tenth the value of the feedback resistor. Thus a gain of 10 is produced and the output signal developed at output terminal 430 of the prior art attenuator is 2.356. The prior art attenuator shifts the decimal point of the potentiometer setting one place to the right, but in doing so loses part of the accuracy capability of potentiometer 424.

In accordance with the principles of this invention, an extended range attenuator is provided with an automatically controllable range function and potentiometer setting. An operator connects the attenuator to a problem patch board by jumper cables 410 and 411. As shown in FIG. 4 an output signal from the digital to analog converter 260, FIG. 2, drives an attenuator servo-motor 407 to any desired value such as .2356 at the potentiometer resistor 408.

In accordance with this invention a plurality of series circuits, each including a normally open relay contact and a resistor, are connected in a parallel ladder circuit between input terminal 410 and the output of the input resistor $R_i$ which is selected along with the feedback resistor $R_f$ to have a ratio of unity. Each of series circuits 405 include a different value of resistor which, in the typical example given, are fractional parts of the input resistor $R_i$. For example, closure of the relay contact at ATK4 connects resistor 412 in parallel with the input resistor $R_i$. Resistor 412 may advantageously be one-half $R_i$ as shown. At summing junction 423 two signal values are inputs for the operational amplifier 401. One value is the setting of the potentiometer 408 at .2356 controlled by the attenuator setting circuit 248 of FIG. 2; and the second value is a range input signal of 2 as designated by the range command circuit 250 of FIG. 2. Reference to the foregoing equation (a) shows that with resistor 412 being $\frac{1}{2}R_i$ an output signal results on the problem patch board which can be expressed by the following equation:

$$\text{(b)} \quad Y = -2X - .2356X$$

$$\text{(c)} \quad Y = -2.2356X$$

There is complete flexibility in range and considerably more accuracy than in the prior art attenuators in accordance with this invention. Other value resistors are present in each one of the series circuits 405 of the extended range ladder circuit and may be selected to produce any desired range value. For example, resistor 413 is ¼ that of $R_i$. Thus if relay coil at ATK3 is activated by an input signal on lead 415 from range command circuit 250, FIG. 2, the output signal at the problem patch board would have a range of 4 plus the decimal fraction of the potentiometer setting on resistor 408.

Analog amplifier computing components

Figures 5, 6:
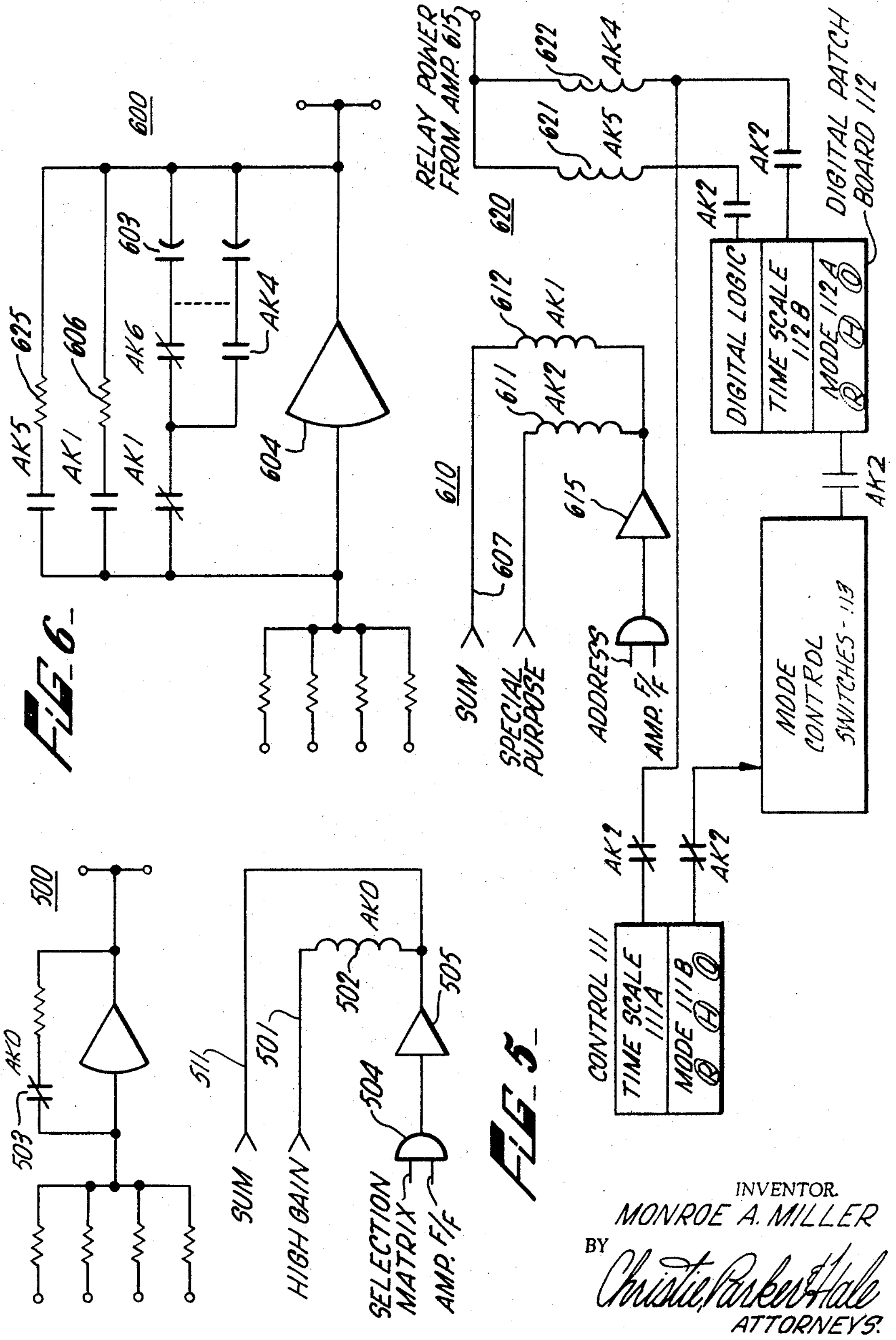
FIG. 5 is a schematic circuit of a bi-state operational amplifier capable of automatic setting as a summer or a high gain amplifier.
FIG. 6 is a schematic circuit of a multi-state operational amplifier capable of automatic setting as an integrator, a summer, or a special purpose integrator-summer.

FIG. 5 depicts a schematic circuit of a bi-state operational amplifier 500. This bi-state amplifier 500 was referred to in Table I hereinbefore as capable of performing the mathematical operations of summing or high gain amplification. The summing operation is the normal condition for the bi-state amplifier 500. Thus at any reset operation, as described hereinbefore, the bi-state amplifier 500 would normally be set in a summing operation state. If, on the other hand, it is desired that the amplifier circuit change its mathematical operation, the function command circuit 245, FIG. 2, would apply a ground signal on lead 501, AND gate 504 is enabled, and relay coil 502 is energized opening contact AK0. With the feedback path open amplification is at high gain by the circuit of FIG. 5.

FIG. 6 depicts a schematic circuit of a multi-state operational amplifier capable of automatically being set in an integrator state, a summing state, or a special purpose integrator state. The state control circuit 610 includes an addressing AND gate, a power amplifier and relay coils 611 and 612, which as discussed hereinbefore respond to input signals on either the sum or special purpose leads to control the relay contacts AK2 or AK1, respectively. If the output signal from the function command circuit 245, FIG. 2, is a command that the amplifier circuit 600 perform a mathematical operation as an integrator, then both the relays 611 and 612 are de-energized and accordingly the respective contacts AK2 and AK1 are in their normal conditions, as shown. With AK1 and AK2 normally closed capacitor 603 is connected in the feedback loop for operational amplifier 604 and the circuit operates as an integrator. The operation of an integrator circuit is well known, and is described in detail for example at page 47 with respect to FIG. 2–5(c) of the previously cited text.

On the other hand, if the function command is that the amplifier 600 perform a summing operation, an input signal on lead 607 energizes relay coil 611 which controls relay contact AK1. Contact AK1, in turn, connects a resistor 606 across the amplifier 604 and at the same time disconnects capacitor 603 from the feedback loop.

A special purpose integrator, mentioned in connection with the description of FIG. 1, is available in accordance with this new and improved analog computer system. A special purpose integrator allows considerable flexibility in problem solving approaches as explained hereinafter. Once a problem solving operation is initiated the analog computing components forming the problem flow path are generally under command of console control 111, FIG. 1. That control 111, as discussed previously, includes a time scale control 111A and an operating mode control 111B for respectively controlling the solution speed and the steps of the problem.

An operator, in accordance with the principles of this invention, may designate selected ones of the integrators, such as integrator 600, as special purpose integrators. This designation by function command 250 divorces those integrators so designated from the console control 111, and at the same time connects these selected integrators to the digital patch board 112. Accordingly, these special purpose integrators are then available for control by a digital computer or other logic signal generating device at patch board 112 for solving selected portions of the over-all problem being solved by the computer.

For example, it may be desirable to accomplish a dual rate problem having the standard integrator circuits in the problem flow path operating at one time scale under command of the console control 111, and the special purpose integrators operating on an entirely different time scale, under control of the digital patch panel. Another typical exmaple of the usefulness of the special purpose integrators includes a time division operation in which it is desirable to select certain repetitive samples from a continually changing variable within the problem signal flow path. If such an operation is desired, the digital logic connects a timing device (not shown) which repetitively enables the special purpose integrator to sample and store a portion of the variable in any well known manner.

FIG. 6 depicts the foregoing described operation wherein the console control 111, and particularly time scale 111A and mode control 111B are disconnected from the mode control switches 113 by the energization of relay coil AK2. Altering the condition of contacts AK2 assures that, at the same instant, the digital patch board 112 is connected to a second amplifier state control circuit 620. This control circuit 620 receives power from amplifier 615 for energizing selected ones of the relays 621 or 622. Time scale 112B of the digital patch board 112 energizes relay 622. Contact AK4 changes the value of capacitance that is connected in the feedback loop for amplifier 604 thus varying the integrating speed for amplifier circuit 600. Numerous other integrating speeds are readily available by a similar operation including other capacitor values which are not shown in detail. Similarly, the mode control 112A of the digital patch board 112 is available to control the RESET, HOLD or OPERATE operation which has been described in detail hereinbefore and need not be repeated. Additionally, a summing operation is also available from the digital patch board and is controlled by the energization of relay 621. Contact AK5 connects resistor 625 across the feedback loop for amplifier 604, turning it into a summer.

It is to be understood that the foregoing features and principles of this invention are merely descriptive, and that many departures and variations thereof are possible by those skilled in the art, without departing from the spirit and scope of this invention.

What is claimed is:

1. An analog computer comprising a first plurality of terminals exposed at a problem patch board for receiving at least one analog input signal to be operated on mathematically by the computer, a second plurality of terminals exposed at the problem patch board for receiving an output signal after a mathematical operation hos been performed on analog signals applied to said input terminals, jumper means adapted for manual connection by an operator at said exposed terminals to complete a problem flow path for said analog computer, at least one analog computing component manually connected by said jumper means in said flow path, said computing component set normally in a first state defining a first mathematical operation to be performed by said component and capable of being electrically settable to another state to perform a different mathematical operation, means associated with said computing component and responsive to operator-initiated elctrical signals for setting said component in different mathematical states, and electrical signal applying means controlled by an operator and connected to said state-setting means of said computing component for automatically setting the component in selected mathematical states.

2. An analog computer in accordance with claim 1 wherein said multi-state computing component is settable in a multiplier state, a divider state, a square root state and a squaring state.

3. An analog computer in accordance with claim 1 wherein said computing component is an amplifier set normally in a high gain amplification state and is settable in response to said operator control means to a summing state.

4. An analog computer in accordance with claim 3 wherein said amplifier is further responsive to said operator control means for being set to an integrator state.

5. An analog computer in accordance with claim 1 wherein said computer component is an attenuator, and further comprising means responsive to said operator control means for designating a decimal fraction input signal for said attenuator, means distinct from said fraction setting means and also responsive to said operator control means for simultaneously applying a second signal along with said decimal fraction signal to the input of said attenuator whereby an output signal is developed by said attenuator which includes a whole number followed by said decimal fraction.

6. An analog computer comprising a first plurality of terminals exposed at a problem patch board for receiving at least one analog input signal to be operated on mathematically by the computer, a second plurality of terminals exposed at the problem patch board for receiving an output signal after a mathematical operation has been performed on analog signals applied to said input terminals, a plurality of analog computing components set normally in a first state defining a first mathematical operation to be performed by said component, each of said computing components being electrically settable to another state to perform a different mathematical operation, means for manually patching a plurality of computing components in a complete circuit between the input and output terminals on the problem patch board, and electrical signal applying means for automatically setting the components in said completed circuit in designated states.

7. An analog computer in accordance with claim 6 wherein said automatic setting means includes a control unit for generating logic level command signals, and further includes decoding means for receiving said logic level command signals and applying state changing signals to said components.

8. An analog computer in accordance with claim 6 wherein at least one of said plurality of computing components is an integrator circuit.

9. An analog computer in accordance with claim 8 and further comprising a digital patch board and means in said decoding means for transferring control of said integrator to said digital patch board.

10. In an analog computer having a problem flow path, a multi-state analog computing component set normally in a first mathematical function state for multiplying input signals applied to said component, means for connecting said computing component in said problem flow path for receiving signals indicative of unknowns in a problem to be solved, signal generating means for generating a plurality of distinct command signals, a first command signal being indicative of a squaring operation by said component, a second command signal being indicative of a dividing operation by said component, and a third command signal being indicative of a square root operation by said component, and mathematical function designating means connected between said signal generating means and said computer component for delivering said state changing command signals to said computing component.

11. An analog computer comprising a patch panel having analog signal entry points and analog signal exit points thereon, a plurality of analog computer components normally set in a first mathematical state and settable in other mathematical states to perform mathematical operations different from the operation performable by said computing component when in said first mathematical state, each of said components having input and output signal terminals available at said analog patch panel, means at said analog patch panel for manually connecting at least one of said analog computing components in a problem signal flow path including at least one analog signal entry point and at least one analog signal exit point, a console control remote from said patch panel, said console control including means responsive to an operator for generating a plurality of logic signals to control the mathematical states of said component connected in said problem flow path, said plurality of logic signals including an address signal to select said one component from among said plurality and a functional command signal for designating a selected mathematical state for said one selected component, means for applying said logic signals to said components, a display device at said console, and means for returning an indication to said display device that said one component has been addressed and has assumed a designated mathematical state.

12. An analog computer in accordance with claim 11 wherein one of said plurality of mathematical states assumed by said component connected in said problem flow path is an integrating state, said console further comprising means to control the time scale of integration limits for said component, a digital patch panel having digital signal entry points and digital signal exit points, means at said digital patch panel for manually connecting said digital patch points in said problem flow path, and means connected between said console control and said digital patch panel and responsive to signals from said console control for transferring command of said one computer component from said console control to said digital patch panel, and means associated with said digital patch panel for generating digital logic signals, said digital signal generating means being operative independently of said console control for controlling the time scale of integration limits for said component in said problem flow path.

13. An analog computer comprising a patch panel having analog signal entry points and analog signal exit points thereon; a signal attenuator circuit having an input terminal and an output terminal; means at said patch panel for manually connecting said input and output terminals of said attenuator to respective analog signal entry and exit points to form a problem flow path for said computer; said attenuator including first means responsive to a first electrical signal for reproducing analog signals at its output terminal having fractional values of an analog signal applied at its input terminal, said attenuator further including a second means responsive to a second electrical signal for simultaneously applying at its output terminal along with said fractional values selected whole numbers; and a control means, remote from and electrically connected to said attenuator, for applying said first and second electrical signals to said first and second signal responsive means.

14. An analog computer having a problem flow path, a plurality of multi-state computing components, means connecting at least one of said computing components in said problem flow path, said one computing component including first electrical signal responsive means setting said component in a first mathematical state for performing a first mathematical operation on signals applied to said one component, said one component further including at least a second electrical signal responsive means for setting said component in a second mathematical state for performing a second mathematical operation on signals applied to said one component, electrical signal generating control means, and means connecting said control means to said computing component setting means for selectively controlling the mathematical states of said computing component.

15. An analog computer in accordance with claim 15 wherein said computing component includes operational amplifier means and wherein said first signal responsive means includes a first relay, said first relay having associated therewith contact means operative when said first relay responds to said first signal for completing a first plurality of electrical circuits for said amplifier means whereby said computing component is set in said first mathematical state.

16. An analog computer in accordance with claim 14 wherein said second signal responsive means includes a second relay, said second relay also having associated therewith contact means operative when said second relay responds to said second signal for interrupting at least one of said first plurality of completed electrical circuits and completing a second plurality of electrical circuits for said amplifier means whereby said computing component is set in said second mathematical state.

17. An analog computer comprising a patch panel having analog signal entry points and analog signal exit points thereon; a signal attenuator circuit having an input terminal and an output terminal; means at said patch panel for manually connecting said input and output terminals of said attenuator to respective analog signal entry and exit points to form a problem flow path for said computer; said attenuator including first means responsive to a first electrical signal for reproducing analog signals at its output terminal having fractional values of an analog signal applied at its input terminal, said attenuator further including a second means responsive to a second electrical signal for simultaneously applying at its output terminal along with said fractional values selected whole numbers; and a control means, remote from and electrically connected to said attenuator, for applying said first and second electrical signals to said first and second signal responsive means, said attenuator further comprises an operational feedback amplifier; a variable resistive means; means connecting said variable resistance means between said attenuator input terminal and said amplifier; said first signal responsive means being responsive to said control means for selectively setting the value of said variable resistive means to develop said fractional signal value at said attenuator output terminal; said attenuator further comprising a plurality of distinct fixed value resistive means connectable in parallel circuits with the selected portion of said variable resistance means by an equal plurality of switching means, one each of said switching means being series connected with one each of said fixed resistance means, and said second signal responsive means including means for closing said switch means to selectively complete a parallel circuit for at least one of said fixed resistive means with said selected portion of said variable resistance means to develop said whole number in addition to said fraction analog signal at said output terminal of said attenuator.

18. An analog computer in accordance with claim 17 wherein said means connecting said variable resistive means to said amplifier comprises an input resistor, $R_1$, having a value selected to provide unity gain for said amplifier; and wherein said plurality of fixed resistive means are each chosen to have resistance values equal to $1/_{nR_1}$, wherein *n* is substantially any integer selected to provide a whole number of value equal to *n* at said output terminal of said attenuator.

References Cited

UNITED STATES PATENTS

| | | | |
|---|---|---|---|
| 3,194,947 | 7/1965 | Sperling | 235—150.4 |
| 3,231,723 | 1/1966 | Gilliland et al. | 235—150.4 |
| 3,243,582 | 3/1966 | Holst | 235—150.4 |

MALCOLM A. MORRISON, Primary Examiner

J. F. RUGGIERO, Assistant Examiner

U.S. Cl. X.R.

235—150.5